March 6, 1962 J. B. ILLO 3,023,425
APPARATUS FOR RECEIVING AND TREATING WASTE MATERIALS
Filed Oct. 19, 1960 2 Sheets-Sheet 1
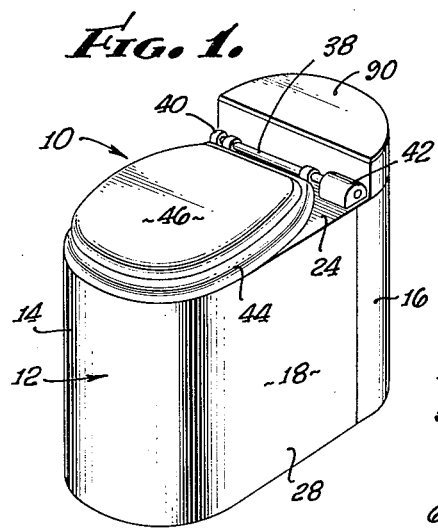
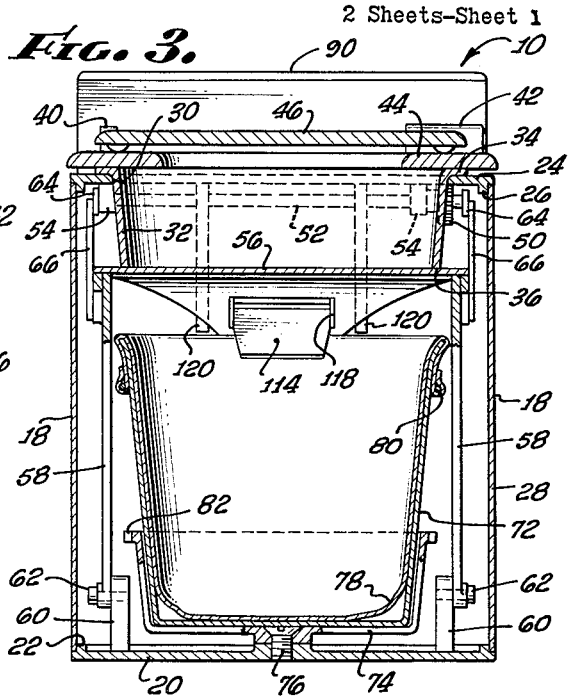
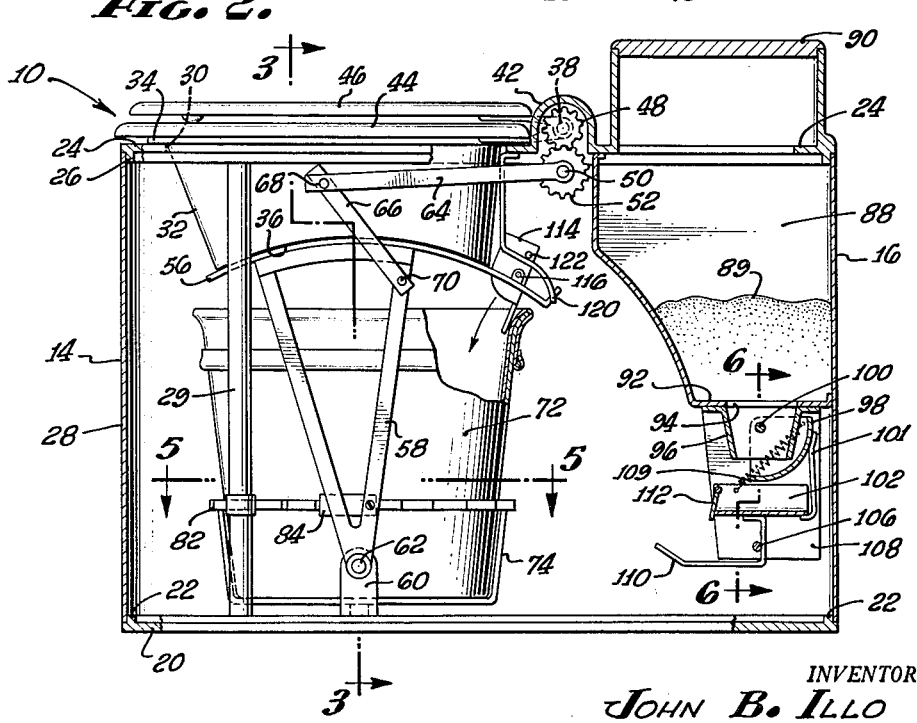
INVENTOR.
JOHN B. ILLO
BY
Huebner & Worrel
ATTORNEYS.

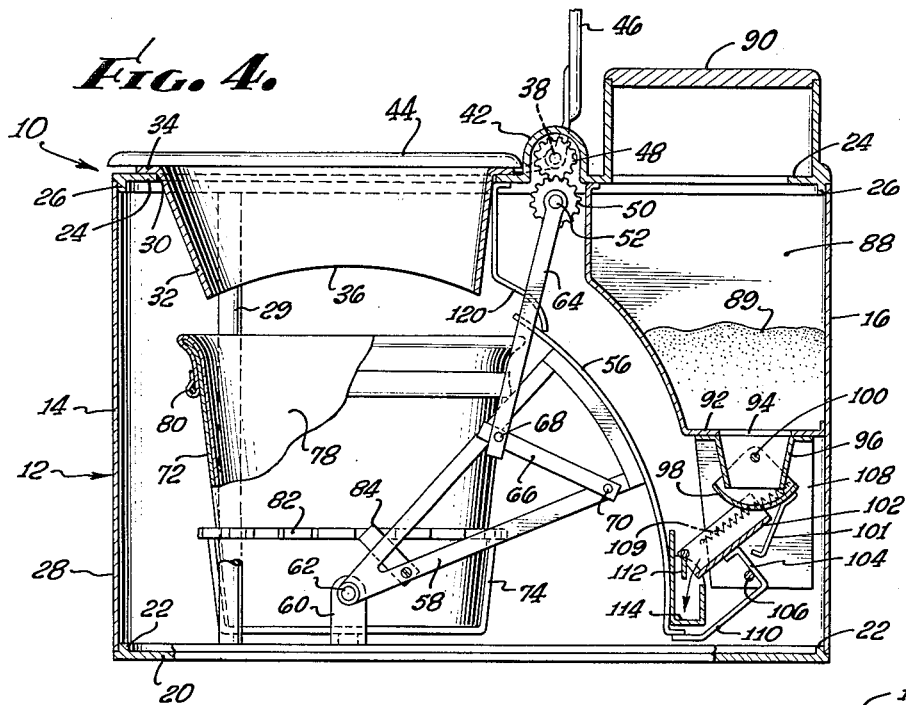
FIG. 4.
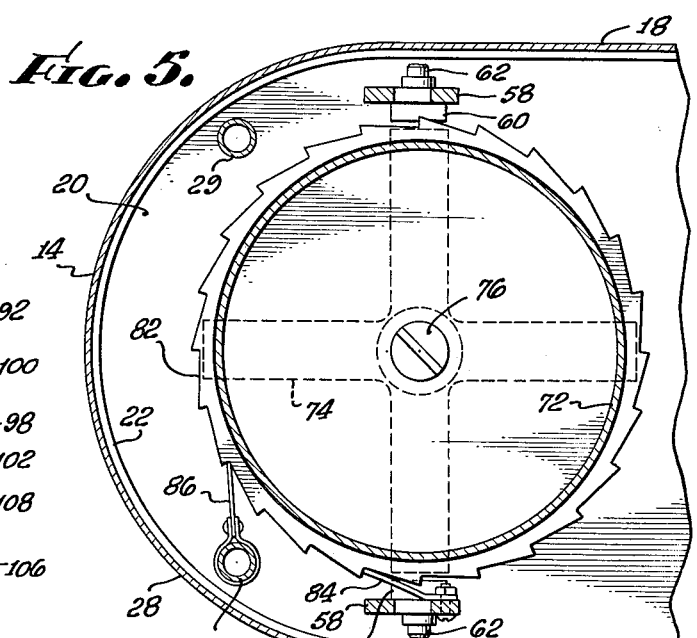
FIG. 5.
FIG. 6.
INVENTOR.
JOHN B. ILLO
BY
Huebner & Worrel
ATTORNEYS.

United States Patent Office 3,023,425
Patented Mar. 6, 1962

3,023,425
APPARATUS FOR RECEIVING AND TREATING WASTE MATERIALS
John B. Illo, 4709 Rodeo Lane, Los Angeles, Calif.
Filed Oct. 19, 1960, Ser. No. 63,566
5 Claims. (Cl. 4—126)

The present invention relates generally to apparatus and methods for receiving and treating human waste materials, and it relates more particularly to a novel apparatus and method for receiving human waste materials, and for demoisturizing the solids, absorbing the liquids and otherwise rendering the waste materials sanitary and eliminating noxious odors therefrom.

There are many places where conventional toilets cannot be used or are not convenient because of the unavailability of running water or of an adequate sewer system, or because of requirements for mobility or portability. Examples of a few places where conventional toilets employing running water and sewage pipe disposal are not practical are in remote areas such as ranches or camping grounds, work projects of all types such as in highway and building construction, mobile homes, trucks, boats, trains and aircraft. Other places will suggest themselves.

Heretofore in such situations the waste materials have usually been collected in septic tanks from which the materials must later be pumped, or in deep chemically-treated seepage pits, or have even been scattered over the ground as with trains or dumped into the water as in the case of boats. Such prior art apparatus and methods for receiving and treating human waste materials are generally expensive, involving equipment which is cumbersome and heavy, and are inconvenient in service and maintenance, and in many instances are unsanitary and provide sources of contamination and of noxious odors. Even where chemical agents are employed in such prior art devices, the conventional procedure is to merely allow the droppings to fall onto the top of the chemicals, which leaves at least the solid waste materials exposed to generate foul odors and attract insects, and to otherwise constitute a nuisance or create a health hazard.

In view of these and other problems in the art, it is an object of the present invention to provide a novel apparatus and method for receiving and treating human waste materials wherein each time fresh droppings or waste materials are received a quantity of a particulate moisture absorbing material having deodorant and disinfectant characteristics is distributed over the top of the droppings so as to dry out the droppings from the top and provide a barrier over the top of the droppings that will disinfect the upper part of the droppings which would otherwise be exposed and that will contain and block off noxious odors which otherwise would be given off by the droppings.

Another object of the present invention is to provide a novel apparatus and method of the character described wherein a quantity of highly absorbent particulate diatomaceous earth is distributed over the top of the waste materials each time they are received so as to dehydrate the waste materials from the top thereof and absorb moisture and odor vapors which would otherwise have been given off by the materials, the preferred form of particulate diatomaceous earth being impregnated by one or more chemical agents having deodorant and disinfectant characteristics.

Another object of the present invention is to provide a novel toilet unit which is self-contained, requiring no running water or plumbing, and which includes container means for receiving the waste materials, a seat positioned above the container means, with a lid pivotally mounted so as to selectively cover or expose the seat, a supply of a particulate absorbent material, and means in the unit operatively connected to the seat lid for automatically distributing a quantity of the absorbent material over the top of the droppings in the container means each time the lid is closed after use of the unit.

A further object of the present invention is to provide a novel self-contained toilet unit which requires no external plumbing, which requires no harsh solid or liquid chemicals, no corrosion-proof tank or periodic pumping of such a tank, which requires no pit to be dug in the ground, which is compact, light in weight, readily portable and low in cost, and which is particularly sanitary and odorless even after many uses.

It is also an object of the invention to provide a novel toilet unit of the character described which, after long usage, is quickly and easily prepared for further use merely by removing and replacing a sanitary bag in the unit which contains the droppings, and providing a fresh supply of the particulate moisture absorbing material.

Additional objects and advantages of the invention will appear during the following part of this specification wherein the details of construction, mode of operation and novel method steps of a preferred embodiment are described with reference to the accompanying drawings, in which:

FIG. 1 is a perspective view of a presently preferred self-contained toilet unit made in accordance with the invention.

FIG. 2 is a vertical section, partly in elevation, illustrating internal details of construction of the unit shown in FIG. 1, the unit being shown in FIG. 2 in its closed position.

FIG. 3 is a vertical section along the line 3—3 in FIG. 2.

FIG. 4 is a vertical section, partly in elevation, similar to FIG. 2, but with the toilet seat lid in open position so that the unit is ready for use.

FIG. 5 is a horizontal section along the line 5—5 in FIG. 2.

FIG. 6 is an enlarged detail section along the line 6—6 in FIG. 2.

Referring to the drawings, I have there illustrated a presently preferred embodiment of the invention comprising a small light-weight portable toilet unit 10. The toilet unit 10 includes a somewhat elongated body 12 having front and rear ends 14 and 16 which are preferably of curved, semi-cylindrical form, with sides 18 which are preferably flat. The body 12 includes a base plate 20 having an upwardly directed flange 22 thereon which extends around base plate 20 adjacent the periphery thereof. Body 12 also includes a top member 24 having a downwardly projecting peripheral flange 26 which is complementary to the flange 22 of base plate 20.

A cylindrical shield 28 is supported along its lower edge on base plate 20 against the outside of flange 22 and extends upwardly from base plate 20, the top member 24 being supported against the upper edge of shield 28 with the peripheral flange 26 of top member 24 seating just inside of the upper edge of shield 28.

It will thus be seen that the base plate 20 encloses the bottom of the toilet unit 10, while shield 28 completely encloses the ends and sides of the unit, and the top member 24 provides an enclosure at the top of the unit.

Although the shield 28 is contemplated to have sufficient structural strength to support the top member 24 and the load placed thereon during use of the unit, I have illustrated additional supporting means for the top member 24 in the form of a plurality of vertical support posts 29 which are connected at their bottom ends to base plate 20 and at their top ends to the top member 24.

The top member 24 is provided in its forward portion with an oblong opening 30 through which a toilet bowl 32 extends. Bowl 32 is preferably removably mounted on the top member 24 by means of an outwardly extending horizontal peripheral flange 34 at the top of bowl 32, the flange 34 resting on the upper surface of top member 24 adjacent to the oblong opening 30, and the bowl 32 extending downwardly through the oblong opening 30. Bowl 32 preferably tapers inwardly from its top to its bottom, and has a bottom edge 36 which is arcuate about a transverse horizontal axis so that the bowl 32 can be sealed off adjacent its bottom edge by an arcuate seal plate, hereinafter described in detail, which is pivotal about this same transverse horizontal axis.

A transverse horizontal shaft 38 is mounted just above the top member 24 to the rear of the oblong opening 30, shaft 38 being supported at one end in an ear 40 extending upwardly from top member 24 and at its other end in a small gear housing 42 which extends upwardly from top member 24. A conventional toilet seat 44 is pivotally mounted on the horizontal shaft 38 so as to swing between a closed, horizontal position as shown in the drawings in which seat 44 rests on top of the bowl flange 34, and a generally vertical or slightly rearwardly tilted open position which would permit removal of the bowl 32 from its operative position.

A lid 46 of conventional construction is fixedly attached to the external horizontal shaft 38 and is pivotal, with accompanying pivotal movement of the shaft 38, between a horizontal closed position as shown in FIGS. 1, 2 and 3 of the drawings, and an upright or slightly rearwardly tilted position as shown in FIG. 4 of the drawings in which the seat 44 is uncovered and available for use.

A drive gear 48 is fixedly mounted on horizontal shaft 38 within the gear housing 42 so as to pivot or rotate with shaft 38 upon pivoting of the lid 46, and a driven gear 50 is disposed below drive gear 48 in operative engagement with drive gear 48, the driven gear 50 being fixedly mounted on a horizontal shaft 52 that is supported in spaced bearing members 54 which extend downwardly from the top member 24.

Arcuate seal plate 56 for sealing off the bowl 32 along its bottom edge 36 is mounted at its sides on a pair of V-shaped support members 58 which are pivotally connected at their lower ends to respective ears or bosses 60 which extend upwardly from base plate 20 by suitable pivot pins 62. As aforesaid, both the seal plate 56 and the bottom edge 36 of bowl 32 are arcuately shaped about a common horizontal transverse axis, this axis being the axis of pivot pins 62. The seal plate 56 has a sliding fit against the bottom edge 36 of bowl 32 and is adapted to swing between a completely closed position as shown in FIG. 2 and a completely open position as shown in FIG. 4.

The pivotal or swinging movement of seal plate 56 is accomplished in response to movement of toilet seat lid 46 by a mechanical connection between driven gear 50 and the seal plate 56. This connection includes a pair of arms 64 secured at one of their ends to the respective ends of shaft 52, and a pair of link members 66 which are connected to the other ends of respective arms 64 by pivot pins 68, and which are pivotally connected to the respective support members 58 for the seal plate by pivot pins 70. When the toilet seat lid 46 is in the closed position of FIG. 2, the arms 64 and links 66 will be in their uppermost positions, with the seal plate 56 in its closed or sealed position. Pivotal movement of lid 46 to its open position as shown in FIG. 4 will rotate drive gear 48 clockwise in FIG. 4 and driven gear 50 anti-clockwise in FIG. 4, thus lowering arms 64 and link members 66 and thereby swinging seal plate 56 clockwise and downwardly to its open position.

A bucket 72 is supported directly below bowl 32 to receive the droppings, bucket 72 being removably supported in a bucket support member 74. Bucket support member 74 is cup-shaped, and is rotatably mounted on base plate 20 by suitable means such as a screw 76. The bucket 72 is provided with a removable liner 78, preferably in the form of a sanitary plastic bag which completely covers the inside of bucket 72 and extends outwardly over the lip of the bucket, being secured against the outer wall of the bucket below the lip by an elastic band 80. By this means the bucket itself is always kept clean, and the droppings are all contained in the bucket liner 78, which can be readily removed and replaced when desired.

In order that the droppings will not pile up in one place in the bucket, but will be uniformly distributed around the bucket, I provide means for automatically rotatably shifting the bucket each time the toilet is used. This means includes a circular ratchet 82 forming the upper lip of bucket support member 74, ratchet 82 being engaged so as to rotatably shift support member 74, and hence bucket 72, by a pawl 84 mounted on one of the V-shaped support members 58. Each time the toilet lid 46 is moved from its open position of FIG. 4 to its closed position of FIG. 2, the pivotal movement of the V-shaped support members 58 will cause pawl 84 to engage one of the ratchet teeth for shifting the position of the bucket. Pawl 84 may simply comprise a flat spring member. I also prefer to provide a dog or latch member 86, which also may be a flat spring member, to prevent reverse movement of the bucket support member 74, the dog or latch member 86 being mounted on one of the vertical support posts 29.

A hopper 88 is provided in the rear portion of the apparatus, and is adapted to receive and contain particulate absorbent material 89. Although the present invention is not limited to the use of any particular absorbent material, a presently preferred material which I have found to be highly effective for my new apparatus and method is granular diatomaceous earth. Such material will take on up to 140% of its own weight in moisture, and has strong odor absorbing characteristics. In order to make the absorbent material even more effective for the present purposes, I prefer to impregnate the material with one or more chemical agents having deodorant and disinfectant characteristics. An excellent chemical agent for this purpose is a Du Pont product sold under the trade name "Rhodia."

The hopper 88 has a removable cover 90 to permit entry of the granular absorbent material 89 into the hopper. Hopper 88 also includes a generally flat bottom 92 having a central opening 94, with a pouring spout 96 extending downwardly from the bottom of the hopper in communication with opening 94. The flat bottom 92 will retain a quantity of the particulate material after the rest has poured through spout 96 as a safeguard against "running out" of the material. A swing gate 98 having an arcuate bottom and flat sides is pivotally connected to spout 96 by means of pivot rod 100, gate 98 normally closing off the bottom of spout 96, but being pivotally shiftable to open spout 96 by movement of an actuating arm 101 attached to gate 98 and extending downwardly therefrom.

A metering bucket 102 is disposed below gate 98, being mounted on a support member 104 which in turn is attached to a horizontal pivot rod 106 which pivots in a support bracket 108 depending from the bottom 92 of the hopper. It will be apparent that the support for pivot rod 106 could alternatively come up from base plate 20.

Metering bucket 102 is tiltable from its uppermost, level position as shown in FIG. 2 wherein it engages the gate actuating arm 101 so as to swing the gate 98 to its open position, and a tilted position as shown in FIG. 4 wherein the gate 98 is free to swing closed. A tension spring 109 is connected at one end to gate 98 and at its other end to bucket 102, spring 109 normally holding bucket 102 in its uppermost, level position of FIG. 2, but also biasing gate 98 to its closed position of FIG. 4 when the bucket 102 is tilted. Tilting of bucket 102 is accomplished by downward actuation of a tripping finger 110 forming an extension of bucket support member 104.

The forward wall of metering bucket 102 comprises a swinging retainer plate 112 which is held by gravity in the closed position when bucket 102 is level as in FIG. 2, but which swings open when bucket 102 is tilted as in FIG. 4.

A conveying bucket 114 is mounted on the seal plate 56, being pivotally attached to ears 116 on seal plate 56. The rear end of seal plate 56, to the rear of bowl 32 when seal plate 56 is in its closed position as in FIG. 2, is provided with an opening 118 through which the contents of conveying bucket 114 are poured when bucket 114 is cammed or tripped to its tilted pouring position of FIG. 2. When the seal plate 56 is moved to its open position as in FIG. 4, its lower or rear edge engages tripping finger 110 so as to tilt metering bucket 102 and pour the contents thereof into conveying bucket 114, swing gate 98 being closed during the tilting of metering bucket 102 to prevent spillage of the absorbent material. When the toilet lid 46 is closed after use of the unit, corresponding upward and forward movement of the seal plate 56 will move conveying bucket 114 up to the position of FIG. 2, but just before the seal plate 56 reaches its closed position, a pair of cam members 120 which extend downwardly from top member 24 engage respective cam pins 122 on conveying bucket 114 to tilt or trip conveying bucket 114 over to its dispensing position of FIG. 2, thereby to disperse the particulate absorbent material 89 from conveying bucket 114 over the fresh droppings within bucket 72. As soon as the closing movement of seal plate 56 commences, the tripping finger 110 is released to permit return of metering bucket 102 to its level position, with swing gate 98 moving to its open position, so that a new load of the particulate absorbent material 89 will flow through spout 96 into metering bucket 102, whereby the metering bucket 102 is again ready to be tripped so as to fill the conveying bucket 114 when the toilet lid 46 is again opened.

It will thus be apparent that the combination of the pouring spout 96, swing gate 98 and metering bucket 102 comprises a metering valve which measures out a predetermined quantity of the particulate absorbent material 89 which will be distributed over the fresh droppings in bucket 72 each time the toilet lid 46 is closed after use of the unit.

The tripping or camming of conveying bucket 114 to its dispensing position of FIG. 2 is quite sudden upon the completion of closure of the toilet lid 46, thus scattering the contents of conveying bucket 114 within bucket 72 so as to provide a good covering of the particulate absorbent material over the fresh droppings. By thus covering the waste materials with the absorbent material each time the unit is used, an effective barrier is provided for absorbing the rising moisture and odor vapors from the waste materials, and the waste materials are dehydrated from the top down, thereby treating that part of the waste materials which would normally be most exposed. In addition to this absorbent material covering over the waste materials for controlling noxious odors and rendering the waste materials sanitary, the bucket 72 and its contents are completely physically sealed off within the body of the unit when the seal plate 56 is in its closed position against the bottom edge of the toilet bowl 32.

If desired, the toilet unit could be vented from the rear, and a blower could be associated with the vent for exhausting the vapors within the unit. However, in practice I have not found such venting to be necessary.

While the instant invention has been shown and described herein, in what is conceived to be the most practical and preferred embodiment, it is recognized that departures may be made therefrom within the scope of the invention, which is therefore not to be limited to the details disclosed herein, but is to be accorded the full scope of the claims.

Having described my invention, what I claim as new and desire to secure by Letters Patent is:

1. A toilet unit which comprises: a body having enclosed bottom, front, rear and side walls, and having a top portion; a toilet seat having an opening therethrough mounted on said top portion; a seat lid pivotally mounted on said top portion adjacent to said seat and pivotal between a closed position covering the seat and an open position in which the seat is uncovered; an upwardly opening receptacle mounted in said body and rotatable about its own axis; ratchet means for rotatably shifting said receptacle responsive to movement of the seat lid in one direction; container means in the body adapted to receive and store particulate material for absorbing moisture and odors; and means operatively connected to said seat lid for automatically dispensing a quantity of said particulate material from said container into said receptacle upon movement of said seat lid from its open position to its closed position.

2. A toilet unit which comprises: support means; a toilet seat having an opening therethrough mounted on said support means; an upwardly opening receptacle mounted on said support under the seat for receiving human waste materials; container means on said support means adapted to receive and store particulate material for absorbing moisture and odors; a triple barrier for preventing the escape of offensive odors from said receptacle comprising a seat lid mounted on said support means adjacent to said seat and movable between a closed position covering the seat and providing a physical barrier and an open position in which the seat is uncovered; means operatively connected to the said seat lid for automatically dispensing a quantity of said particulate material from said container into said receptacle upon movement of said seat lid from its open position to its closed position providing a chemical barrier; and means operatively connected to said lid and movably mounted in said body below the seat so as to be movable to a closed position when the seat lid is moved to a closed position providing a physical barrier and movable to an open position when the seat lid is moved to an open position.

3. A toilet unit which comprises: a body having enclosed bottom, front, rear and side walls and having a top portion; a toilet seat having an opening therethrough mounted on said top portion; a seat lid pivotally mounted on said top portion adjacent to said seat and pivotal between a closed position covering the seat and an open position in which the seat is uncovered; an upwardly opening receptacle mounted in the body under the seat to rotate about its own axis; ratchet means for rotatably shifting said receptacle responsive to movement of the seat lid in one direction; a seal plate movably mounted in the body below the seat so as to be movable between a closed position closing off the seat opening and an open position in which the seat opening communicates with the inside of the body; means connecting the seat lid to said seal plate for moving said plate to its closed position when the seat lid is moved to its closed position and for moving said plate to its open position when the seat lid is moved to its open position; container means in the body adapted to receive and store particulate material for absorbing moisture and odors; and means operatively connected to said seat lid for automatically dispensing a quantity of said particulate material from said container into said receptacle upon movement of said seat lid from its open position to its closed position.

4. A toilet unit which comprises: a body having enclosed bottom, front, rear and side walls and having a top portion; a toilet seat having an opening therethrough mounted on said top portion; a seat lid pivotally mounted on said top portion adjacent to said seat and pivotal between a closed position covering the seat and an open position in which the seat is uncovered; an upwardly opening receptacle mounted in the body under the seat; a seal plate movably mounted in the body below the seat so as to be movable between a closed position closing off the seat opening and an open position in which the seat opening communicates with the inside of the body; means connecting the seat lid to said seal plate for moving said plate to its closed position when the seat lid is moved to its closed position and for moving said plate to its open position when the seat lid is moved to its open position; container means in the body adapted to receive and store particulate material for absorbing moisture and odors; and means operatively connected to said seat lid for automatically dispensing a quantity of said particulate material from said container into said receptacle upon movement of said seat lid from its open position to its closed position, said dispensing means including a conveyer bucket connected to said seal plate so as to be movable from a particulate material receiving position adjacent to said container when the seal plate is in its open position to a particulate material dispensing position adjacent to said receptacle when the seal plate is in its closed position, and metering valve means in the body for receiving a measured quantity of said particulate material from said container and depositing said measured quantity of material in said conveyer bucket when the conveyer bucket is in its said material receiving position.

5. A toilet unit which comprises: a body having enclosed bottom, front, rear and side walls, and having a top portion; a toilet seat having an opening therethrough mounted on said top portion; a seat lid pivotally mounted on said top portion adjacent to said seat and pivotal between a closed position covering the seat and an open position in which the seat is uncovered; an upwardly opening receptacle mounted in the body under the seat; container means in the body adapted to receive and store particulate material for absorbing moisture and odors; and dispensing means operatively connected to said seat lid for automatically dispensing a quantity of said particulate material from said container into said receptacle upon movement of said seat lid from its open position to its closed position comprising a conveyer bucket operatively connected to said seat lid so as to be movable from a particulate material receiving position adjacent to said container when the seat lid is in its open position to a particulate material dispensing position adjacent to said receptacle when the seat lid is in its closed position, said dispensing means including metering valve means in the body for receiving a measured quantity of said particulate material from said container and depositing said measured quantity of material in said conveyer bucket when the conveyer bucket is in its material receiving position.

References Cited in the file of this patent
UNITED STATES PATENTS

| | | |
|---|---|---|
| 133,899 | Smith | Dec. 10, 1872 |
| 145,756 | Russell et al. | Dec. 23, 1873 |
| 401,709 | McClellan | Apr. 16, 1889 |
| 984,696 | Ogden | Feb. 21, 1911 |